United States Patent
Yang et al.

(10) Patent No.: US 10,663,838 B2
(45) Date of Patent: May 26, 2020

(54) CAMERA MODULE AND TERMINAL

(71) Applicant: VIVO MOBILE COMMUNICATION CO., LTD., Dongguan (CN)

(72) Inventors: Shangming Yang, Dongguan (CN); Zhuojian Yang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/314,255

(22) PCT Filed: Jun. 29, 2017

(86) PCT No.: PCT/CN2017/090872
§ 371 (c)(1),
(2) Date: Dec. 28, 2018

(87) PCT Pub. No.: WO2018/001327
PCT Pub. Date: Jan. 4, 2018

(65) Prior Publication Data
US 2019/0227410 A1 Jul. 25, 2019

(30) Foreign Application Priority Data
Jun. 30, 2016 (CN) .......................... 2016 1 0512369

(51) Int. Cl.
*H04N 5/225* (2006.01)
*G03B 17/02* (2006.01)
(Continued)

(52) U.S. Cl.
CPC .............. *G03B 17/02* (2013.01); *G03B 11/00* (2013.01); *G03B 17/00* (2013.01); *H04M 1/02* (2013.01);
(Continued)

(58) Field of Classification Search
CPC ...................................................... H04N 5/225
(Continued)

(56) References Cited

U.S. PATENT DOCUMENTS

2013/0128107 A1    5/2013   Ku

FOREIGN PATENT DOCUMENTS

| CN | 101153948 A | 4/2008 |
| CN | 103185942 A | 7/2013 |

(Continued)

OTHER PUBLICATIONS

International Search Report and Written Opinion, corresponding International Application No. PCT/CN2017/090872, dated Sep. 18, 2017.

*Primary Examiner* — Joel W Fosselman
(74) *Attorney, Agent, or Firm* — Marshall, Gerstein & Borun LLP

(57) ABSTRACT

A camera assembly includes: a hollow lens base, having a first and second accommodation chamber from up to down, an inner diameter of the first accommodation chamber being smaller than that of the second accommodation chamber, the second accommodation chamber being configured to accommodate an image sensor, the top of the first accommodation chamber having an opening; a lens cone, arranged on the lens base and having an extension member at the bottom, an inner diameter of the extension member being greater than an outer diameter of a side wall of the first accommodation chamber; and a driving motor, connected to the lens cone and configured to control the lens cone to move reciprocally in a predetermined direction. During the reciprocal movement, an end surface of the extension member is always located below a top surface of the first accommodation chamber where the opening is provided.

9 Claims, 2 Drawing Sheets

(51) Int. Cl.
  *H04M 1/02* (2006.01)
  *G03B 17/00* (2006.01)
  *G03B 11/00* (2006.01)
(52) U.S. Cl.
  CPC .......... *H04N 5/225* (2013.01); *H04N 5/2252* (2013.01); *H04N 5/2254* (2013.01)
(58) Field of Classification Search
  USPC ........................................................ 348/335
  See application file for complete search history.

(56) References Cited

FOREIGN PATENT DOCUMENTS

| | | |
|---|---|---|
| CN | 204089963 U | 1/2015 |
| CN | 205123463 U | 3/2016 |
| CN | 105897972 A | 8/2016 |

CAMERA MODULE AND TERMINAL

CROSS-REFERENCE TO RELATED APPLICATION

The present application is the U.S. national phase of PCT Application No. PCT/CN2017/090872 filed on Jun. 29, 2017, which claims a priority of the Chinese patent application No. 201610512369.X filed on Jun. 30, 2016, which is incorporated herein by reference in its entirety.

TECHNICAL FIELD

The present disclosure relates to the technology field of a camera design, in particular to a camera assembly and a terminal.

BACKGROUND

Currently, most of the mobile devices, e.g., mobile phones and flat-panel computers, are equipped with a camera assembly, so as to achieve the conversion between an optical signal and an electric signal, and record and store image information, thereby to shoot a picture or a video. However, it is impossible to completely seal the camera assembly and a rotor of a motor in the camera assembly may drive a lens to move up and down, so micron-sized dust may enter the imaging region of the camera assembly through the gap between the rotor and the housing of the motor. At this time, the camera assembly may be contaminated, so that more than a half of all defects for the camera assembly are caused. Hence, the yield of the camera assemblies and the mobile devices may be adversely affected.

There are principally the following two schemes for preventing the contaminations. In the first scheme, it is necessary to add as many dustproof structures as possible during the designing of the camera assembly, e.g., a dustproof groove is added inside the motor of the camera. At this time, the size of the motor may increase due to the dustproof groove, so it is adverse to the miniaturization of the mobile device. In the second scheme, it is necessary to ensure as high dustproof level of the environment where production lines for the camera assembly and the mobile devices are located as possible, e.g., in the factory for the camera assembly, the dustproof level of the environment where the camera assembly is assembled is 100, and a dustproof level of some topical regions is 10.

SUMMARY

In one aspect, the present disclosure provides in some embodiments a camera assembly, including: a lens base, being a hollow structure and provided with a first accommodation chamber and a second accommodation chamber arranged below the first accommodation chamber, the inner diameter of the first accommodation chamber being smaller than the inner diameter of the second accommodation chamber, the second accommodation chamber being configured to accommodate an image sensor, the top of the first accommodation chamber being provided with an opening; a lens cone, arranged on the lens base and provided with an extension member at the bottom, the inner diameter of the extension member being greater than an outer diameter of the side wall of the first accommodation chamber; and a driving motor, connected to the lens cone and configured to control the lens cone to move back and forth in a predetermined direction. During the movement of the lens cone, the end surface of the extension member is always below the surface of the top of the first accommodation chamber where the opening is provided.

In another aspect, the present disclosure provides in some embodiments a terminal including the above-mentioned camera assembly.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

First Embodiment

Figure 1:
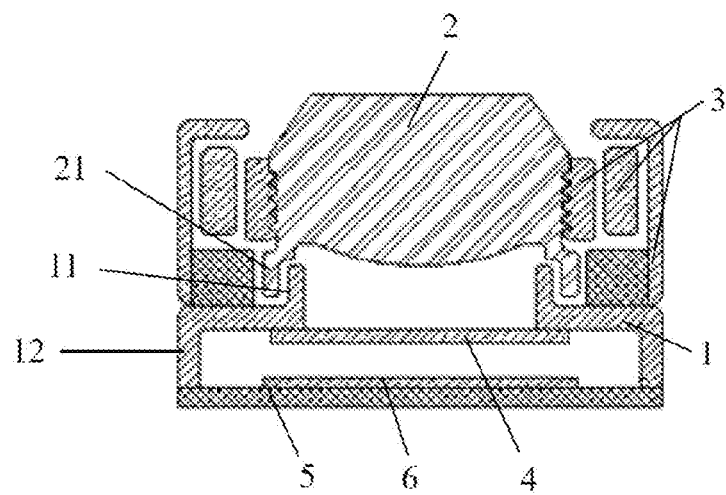
FIG. 1 is a schematic view showing a structure of a camera assembly according to the first embodiment of the present disclosure.

As shown in FIG. 1, the present disclosure provides in this embodiment a camera assembly which includes a lens base 1, a lens cone 2 and a driving motor 3. The lens base 1 is of a hollow structure, and provided with a first accommodation chamber 11 and a second accommodation chamber 12 arranged below the first accommodation chamber 11. The inner diameter of the first accommodation chamber 11 is smaller than the inner diameter of the second accommodation chamber 12. In addition, the second accommodation chamber 12 is configured to accommodate therein an image sensor 6, and the first accommodation chamber 11 is provided with an opening at the top. The lens cone 2 is arranged on the lens base 1, and provided with an extension member 21 at the bottom. The inner diameter of the extension member 21 is greater than the outer diameter of the side wall of the first accommodation chamber 11, so the extension member 21 is capable of being sleeved onto the outside surface of the first accommodation chamber 11. The driving motor 3 is connected to the lens cone 2, so as to control the lens cone 2 to move back and forth in a predetermined direction. During the movement of the lens cone 2, the end surface of the extension member 21 is always below the surface of the first accommodation chamber 11 where the opening is provided.

Figure 3:
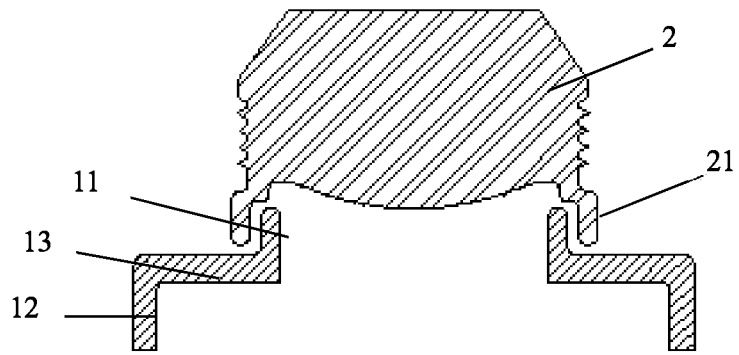
FIG. 3 is a schematic view showing a situation where the lens cone is assembled with a lens base according to the first embodiment of the present disclosure.

Since the inner diameter of the first accommodation chamber 11 of the hollow lens base 1 is smaller than the inner diameter of the second accommodation chamber 12, it is able to provide a structure for image projection. Through the opening at the top of the first accommodation chamber 11, it is able for the image sensor 6 within the second accommodation chamber 12 to receive a light beam passing through the lens cone 2. The extension member 21 is arranged at the bottom of the lens cone 2 on the lens base 1. Usually, the lens cone 2 is of a circular shape, so the extension member 21 may be of a cylindrical shape. In addition, the inner diameter of the extension member 21 is greater than the outer diameter of the side wall of the first accommodation chamber 11, i.e., the extension member 21 is sleeved onto the outside surface of the first accommodation chamber 11 and there is a gap between the extension member 21 and the outside surface of the first accommodation chamber 11. When the driving motor 3 connected to the lens cone 2 drives the lens cone 2 to move back and forth in the predetermined direction, the end surface of the extension member 21 may be always below the surface of the first accommodation chamber 11 where the opening is provided during the movement of the lens cone 2. As shown in FIG. 3, the end surface is formed at an undermost portion (i.e., an end portion) of the extension member 21 of the lens cone 2. The opening is formed in the top surface of the first accommodation chamber 11. During the actual movement of the lens cone 2, the end surface of the extension member 21 is always below the surface of the first accommodation chamber 11 where the opening is provided, so due to the extension member 21, it is able to prevent the dust from entering the imaging region below the lens cone 2 through the gap surrounding the lens cone 2, and prevent the camera assembly from being contaminated, thereby to improve the first pass yield of the camera assembly. In addition, it is able to prevent the image quality from being adversely affected due to mobile contaminations, thereby to improve the photographing effect of the camera assembly.

Further, as shown in FIGS. 1 and 3, in order to enable the extension member 21 to be feasibly assembled with the first accommodation chamber 11 and enable the extension member 21 to move back and forth with the lens cone 2, the difference between the inner diameter of the extension member 21 and the outer diameter of the side wall of the first accommodation chamber 11 is between 0.1 mm and 0.25 mm. In this way, when the extension member 21 is sleeved onto the outside surface of the side wall of the first accommodation chamber 11, the extension member 21 may move freely during the movement of the lens cone 2.

Figure 2:
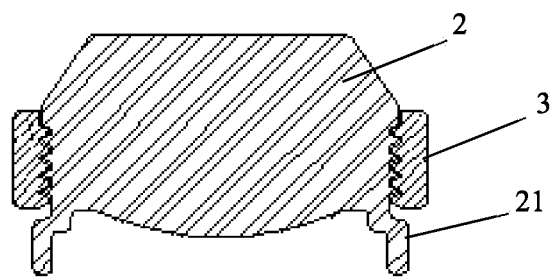
FIG. 2 is a schematic view showing a situation where a lens cone is assembled with a driving motor according to the first embodiment of the present disclosure.

In addition, as shown in FIGS. 1 to 3, the height of the extension member 21 of the lens cone 2 is between 0.15 mm to 0.4 mm, optionally 0.3 mm. During the movement of the lens cone 2, it is able to ensure that the end surface of the extension member 21 is always below the surface of the first accommodation chamber 11 where the opening is provided. As a result, after the dust enter the camera assembly, it will be prevented by the side wall of the first accommodation chamber 11 and the extension member 21, it is able to prevent the dust from entering the first accommodation chamber 11 and the imaging region, thereby to effectively prevent the camera assembly from being contaminated.

Figure 4:
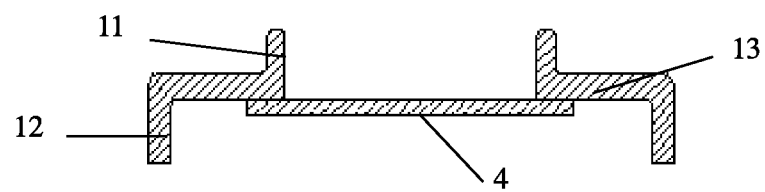
FIG. 4 is a schematic view showing a situation where an optical filter is assembled with the lens base according to the first embodiment of the present disclosure.

To be specific, as shown in FIGS. 3 and 4, in order to improve a dustproof effect of the camera assembly through the lens base, the side wall of the first accommodation chamber 11 may be connected to the side wall of the second accommodation chamber 12 through a shoulder 13 of the lens base, and a silica gel layer (not shown) may be provided at the outer surface of the shoulder 13. In addition, in a possible embodiment of the present disclosure, a silica gel layer (not shown) may also be provided at the outer surface of the side wall of the first accommodation chamber 11. In this way, even when the dust has entered the gap between the extension member 21 and the side wall of the first accommodation chamber 11 and the camera assembly is inclined or inverted, it is still able to prevent the dust from entering the first accommodation chamber 11 by adhering the dust by the silica gel layer on the shoulder 13 or the silica gel layer at the outer surface of the side wall of the first accommodation chamber 11, thereby to prevent the camera assembly from being contaminated.

As shown in FIGS. 1 and 4, the camera assembly further includes an optical filter 4 arranged within the lens base 1 at the junction between the first accommodation chamber 11 and the second accommodation chamber 12. To be specific, the optical filter 4 may be attached to the junction between the first accommodation chamber 11 and the second accommodation chamber 12.

During the assembling of the optical filter 4, since the inner diameter of the first accommodation chamber 11 is smaller than the inner diameter of the second accommodation chamber 12, it is very difficult to fix the optical filter 4 inside the lens base 1 when the components of the lens base 1 are assembled from top to bottom. Hence, the optical filter 4 may be attached to the junction between the first accommodation chamber 11 and the second accommodation chamber 12 from bottom to top. In addition, the optical filter 4 may be adhered to the junction between the first accommodation chamber 11 and the second accommodation chamber 12 using an adhesive.

As shown in FIG. 1, the camera assembly further includes a circuit board 5 arranged at the bottom of the second accommodation chamber 12. The image sensor 6 is arranged on the circuit board 5 and opposite to the optical filter 4. In addition, the circuit board 5, the optical filter 4 and the second accommodation chamber 12 may form a hermetical chamber. When the image sensor 6 is arranged opposite to the optical filter 4, it is able to project the optical image treated by the optical filter 4 toward the surface of the image sensor 6.

According to the camera assembly in the first embodiment of the present disclosure, during the movement of the lens cone, the end surface of the extension member is always below the surface of the first accommodation chamber where the opening is provided. As a result, during the movement of the lens cone, it is able to prevent the dust from entering the imaging region below the lens cone through the gap surrounding the lens cone, and prevent the camera assembly from being contaminated, thereby to improve the first pass yield of the camera assembly. In addition, it is able to prevent the image quality from being adversely affected due to mobile contaminations, thereby to improve the photographing effect of the camera assembly.

Second Embodiment

The present disclosure further provides in this embodiment a terminal which includes the camera assembly mentioned in the first embodiment. To be specific, the terminal may be a mobile terminal such as a mobile phone or a flat-panel computer, or a terminal such as a desktop computer or a laptop computer.

The terminal in this embodiment is capable of implementing the procedures implemented by the above-mentioned camera assembly, which will not be particularly defined herein.

The above embodiments are described in a progressive manner, and the same or similar contents in the embodiments may not be repeated, i.e., each embodiment merely focuses on the difference from the others.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A camera assembly, comprising:
    a lens base, being a hollow structure and provided with a first accommodation chamber and a second accommodation chamber arranged below the first accommodation chamber, an inner diameter of the first accommodation chamber being smaller than an inner diameter of the second accommodation chamber, the second accommodation chamber being configured to accommodate an image sensor, the top of the first accommodation chamber being provided with an opening;
    a lens cone, arranged on the lens base and provided with an extension member at the bottom, an inner diameter of the extension member being greater than an outer diameter of a side wall of the first accommodation chamber; and
    a driving motor, connected to the lens cone and configured to control the lens cone to move back and forth in a predetermined direction,
    wherein during the movement of the lens cone, an end surface of the extension member is always located below a surface of the top of the first accommodation chamber where the opening is provided.

2. The camera assembly according to claim 1, wherein a difference between the inner diameter of the extension member and the outer diameter of the side wall of the first accommodation chamber is between 0.1 mm and 0.25 mm.

3. The camera assembly according to claim 1, wherein the extension member has a height between 0.15 mm and 0.4 mm.

4. The camera assembly according to claim 1, wherein the side wall of the first accommodation chamber is connected to a side wall of the second accommodation chamber through a shoulder of the lens base, and a silica gel layer is arranged on an outer surface of the shoulder.

5. The camera assembly according to claim 1, wherein a silica gel layer is arranged on an outer surface of the side wall of the first accommodation chamber.

6. The camera assembly according to claim 1, further comprising an optical filter arranged within the lens base at a junction between the first accommodation chamber and the second accommodation chamber.

7. The camera assembly according to claim 6, wherein the optical filter is attached to the junction between the first accommodation chamber and the second accommodation chamber.

8. The camera assembly according to claim 6, further comprising a circuit board arranged at the bottom of the second accommodation chamber, wherein the image sensor is arranged on the circuit board and opposite to the optical filter, and the circuit board, the optical filter and the second accommodation chamber form a hermetical chamber.

9. A terminal, comprising the camera assembly according to claim 1.

* * * * *